United States Patent
Bellamy

[11] Patent Number: 5,457,717
[45] Date of Patent: Oct. 10, 1995

[54] APPARATUS AND METHOD FOR ELIMINATING MAPPING JITTER

[75] Inventor: John C. Bellamy, Coppell, Tex.

[73] Assignee: DSC Communications Corporation, Plano, Tex.

[21] Appl. No.: 158,967

[22] Filed: Nov. 29, 1993

[51] Int. Cl.⁶ .............................. H04L 7/00; H04L 25/36
[52] U.S. Cl. .......................... 375/372; 375/371; 375/363; 370/105.3
[58] Field of Search ..................................... 375/118, 119, 375/112, 363, 371, 372, 373; 370/105.3

[56] References Cited

U.S. PATENT DOCUMENTS

| | | | |
|---|---|---|---|
| 4,811,340 | 3/1989 | McEachern et al. | 375/118 |
| 5,052,025 | 9/1991 | Duff et al. | 370/49 |
| 5,119,406 | 6/1992 | Kramer | 375/112 |
| 5,200,982 | 4/1993 | Weeber | 375/118 |
| 5,268,936 | 12/1993 | Bernardy | 375/118 |
| 5,311,511 | 5/1994 | Reilly et al. | 375/118 |
| 5,337,334 | 8/1994 | Molloy | 375/118 |
| 5,343,476 | 8/1994 | Urbansky | 375/112 |
| 5,357,514 | 10/1994 | Yoshida | 375/112 |
| 5,367,545 | 11/1994 | Yamashita et al. | 375/118 |

FOREIGN PATENT DOCUMENTS

| | | | |
|---|---|---|---|
| 9316535 | 8/1993 | Finland | 375/118 |
| 9316536 | 8/1993 | Finland | 375/118 |

Primary Examiner—Stephen Chin
Assistant Examiner—Jeffrey W. Gluck
Attorney, Agent, or Firm—Baker & Botts

[57] ABSTRACT

A desynchronizer (10) for eliminating output mapping jitter includes a demapper circuit (12) for reading asynchronous data and a clock rate of an embedded signal within a synchronous channel (14). Payload data from the embedded signal is buffered within an elastic store circuit (17). The demapper circuit (12) outputs bit stuff and pointer justification timing adjustments to an overhead gapfill circuit (19) and a pointer justification leaky accumulator circuit (20). The overhead gapfill circuit (19) calculates overhead gaps within the payload data in order to generate a gapfill value (34). The pointer justification leaky accumulator circuit (20) determines the bit stuffs and pointer justifications occurring in the payload data in order to produce an accumulated value (36). The gapfill value (34) and accumulated value (36) are combined with an elastic fill value (18) from the elastic store circuit (17) in order to eliminate instantaneous variations within the elastic fill value (18) due to overhead gaps within the payload data and reduce the effect of bit stuff and pointer justification timing adjustments within the elastic fill value (18). An adjusted fill value is fed to a low pass filter (30) and a voltage controlled oscillator (32) of a clock recovery phase lock loop circuit (29). The clock recovery phase lock loop circuit (29) generates an output clock signal for transmitting the payload data from the elastic store circuit (17) without any mapping jitter due to overhead gaps and a reduction in jitter caused by timing adjustments.

19 Claims, 2 Drawing Sheets

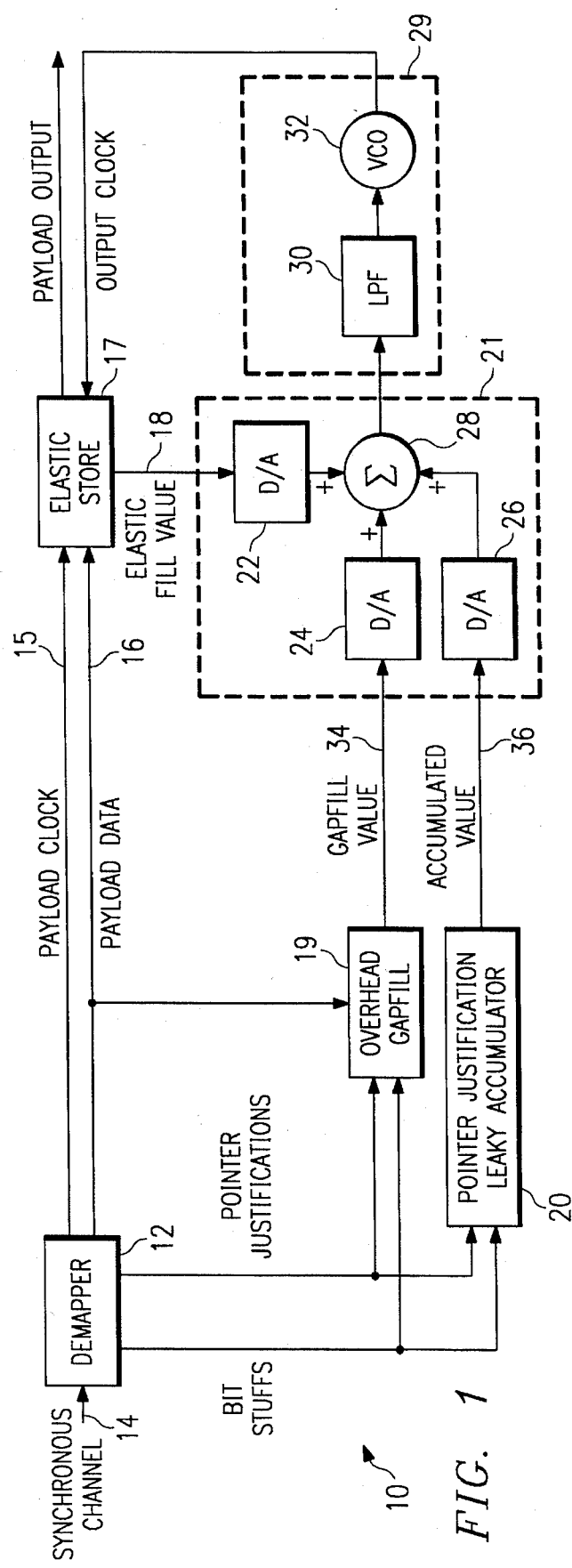
FIG. 1
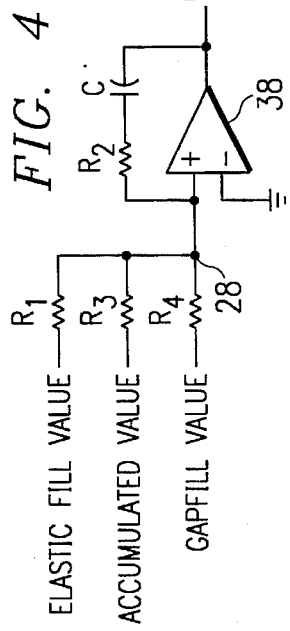
FIG. 4
FIG. 2
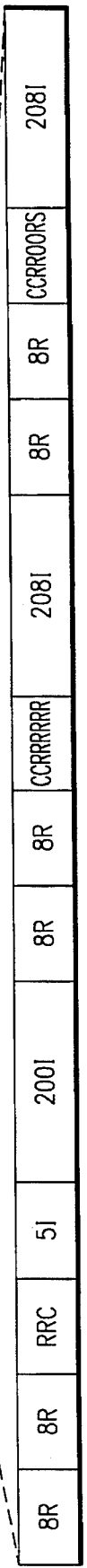

WRITE ADDRESS BITS (WR5 IS MSB, WR6 IS WR5/2)

READ ADDRESS BITS (RD5 IS MSB, RD6 IS RD5/2)

XOR = WR6 ⊕ RD6     SLOW DOWN (SD) = RD2 SET/WR2 CLEAR

XOR = WR6 ⊕ RD6     SPEED UP (SU) = WR2 SET/RD2 CLEAR

SPEED UP/DOWN = XOR∧$\overline{SD}$ + SU

APPARATUS AND METHOD FOR ELIMINATING MAPPING JITTER

TECHNICAL FIELD OF THE INVENTION

The present invention relates in general to telecommunications networks and more particularly to an apparatus and method for eliminating mapping jitter.

BACKGROUND OF THE INVENTION

A desynchronizer is a device that recovers an embedded signal containing asynchronous data at a specific clock rate from within a higher rate digital bit stream of a synchronous channel. The clock rate for the embedded signal is unrelated to the clock rate for the synchronous channel. When the embedded signal is multiplexed into the synchronous channel, it is necessary to synchronize the embedded signal with bit or byte timing adjustments. The process of recovering the asynchronous data and clock rate of the embedded signal is complicated by data gaps and overhead timing adjustments necessary to map the embedded signal into the synchronous channel.

The conventional approach to accommodating the overhead gaps is to allow them to appear as fluctuations in the instantaneous fill level of a data buffer referred to as an elastic store. Clock recovery is accomplished by using the fill level of the elastic store to drive a low pass filter, which in turn drives a voltage control oscillator, to produce a desired clock signal for synchronous transmission of the data from the elastic store. High frequency instantaneous variations in the elastic store fill value, due to the overhead gaps installed during synchronization, are filtered by the low pass filter but not completely eliminated. Mapping jitter remains on the output of the desynchronizer due to instantaneous variations in the elastic store fill value that are not fully filtered out. Therefore, it is desirable to have a desynchronizer without any mapping jitter on its output.

From the foregoing, it may be appreciated that a need has arisen for a desynchronizer device that eliminates instantaneous variations in the elastic store fill value caused by overhead gaps on the synchronous channel. A need has also arisen to remove mapping jitter from the output of the desynchronizer device.

SUMMARY OF THE INVENTION

In accordance with the present invention, an apparatus and method for eliminating mapping jitter are provided which substantially eliminate or reduce disadvantages and problems associated with conventional desynchronizer devices.

According to an embodiment of the present invention, there is provided an apparatus for eliminating mapping jitter that includes a demapper circuit for reading asynchronous data and a clock rate of an embedded signal within a synchronous payload envelope received over a synchronous channel and an elastic store circuit for storing the asynchronous data, including overhead gaps and timing adjustments, read by the demapper circuit according to the clock rate of the embedded signal. Instantaneous variations due to overhead gaps in a fill value of the elastic store circuit are determined by an overhead gapfill circuit. A mapping jitter elimination circuit eliminates the instantaneous variations determined by the overhead gapfill circuit in order to recover an output clock rate for the synchronous transfer of asynchronous data from the elastic store circuit.

The apparatus and method of the present invention provide various technical advantages over conventional desynchronizer devices. For example, one technical advantage is in determining the instantaneous variations in the fill value of the elastic store circuit due to overhead gaps placed in the embedded signal during synchronization. Another technical advantage is in eliminating the instantaneous variations in order to recover an output clock rate for the synchronous transmission of the asynchronous data within the elastic store circuit. Yet another technical advantage is in eliminating mapping jitter from the recovered output clock rate of the desynchronizer device. Other technical advantages are readily apparent to one skilled in the art from the following figures, descriptions, and claims.

BRIEF DESCRIPTION OF THE DRAWINGS

For a more complete understanding of the present invention and the advantages thereof, reference is now made to the following description taken in conjunction with accompanying drawings, wherein like reference numerals represent like parts, in which:

FIG. 1 illustrates a block diagram of a desynchronizer device;

FIG. 2 illustrates a diagram of an embedded signal mapped into a synchronous payload envelope;

FIG. 4 is a simplified schematic diagram of a low pass filter within the desynchronizer device.

DETAILED DESCRIPTION OF THE INVENTION

Figure 3:
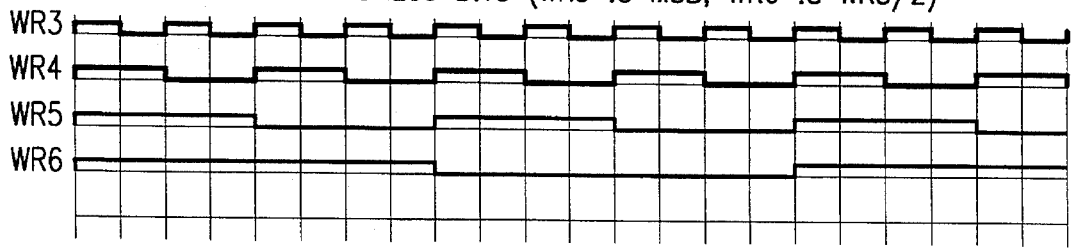
FIG. 3 is a timing diagram illustrating an enhanced operating mode of the desynchronizer device.
Figure 3:
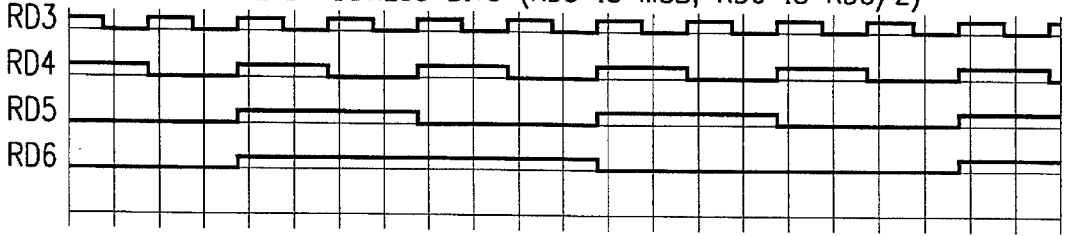
Figure 3:
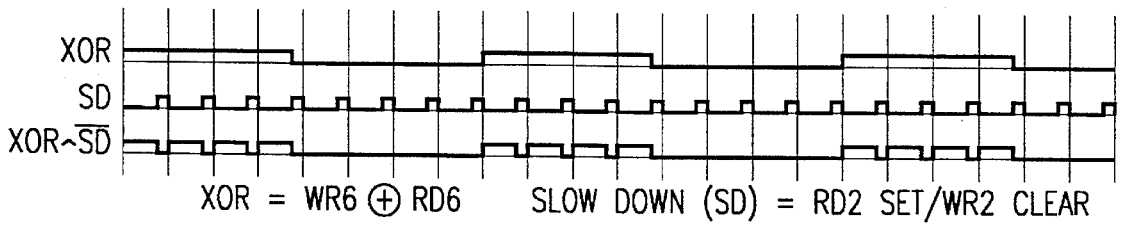
Figure 3:
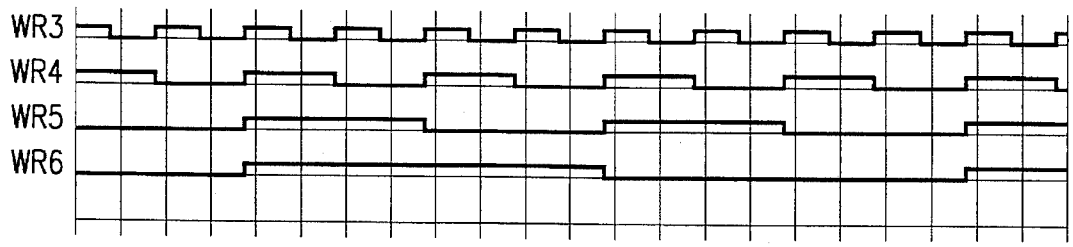
Figure 3:
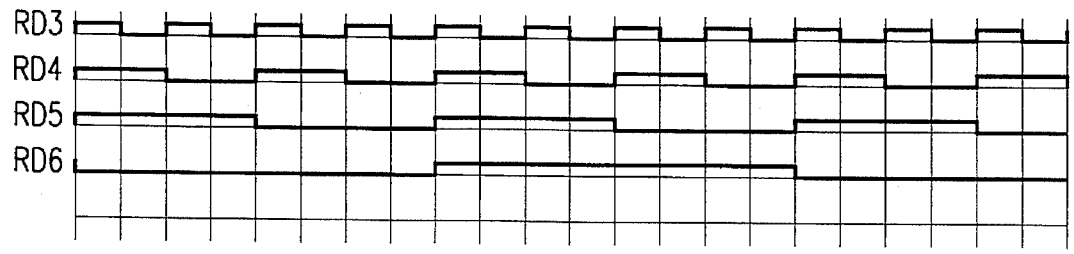
Figure 3:
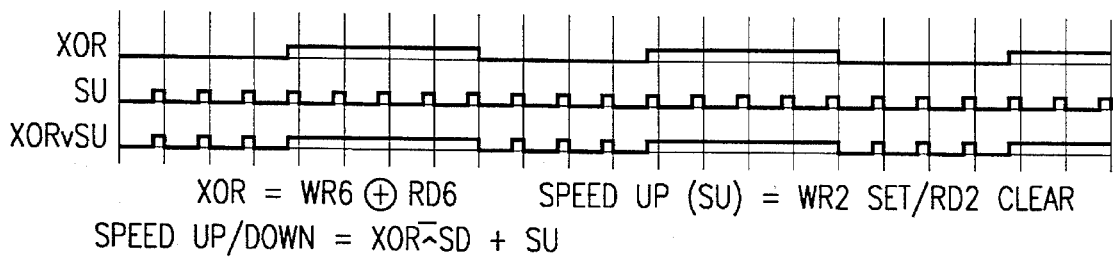

FIG. 1 is a block diagram of a desynchronizer device 10. Desynchronizer device 10 includes a demapper circuit 12 that receives synchronous data at a synchronous clock rate over synchronous channel 14. Demapper circuit 12 extracts a payload clock 15 and a payload data 16 for an embedded signal within synchronous channel 14. Payload data 16 is buffered within an elastic store circuit 17 according to payload clock 15. Elastic store circuit 17 generates an elastic fill value 18 indicating a depth of asynchronous data within elastic store circuit 17. Demapper circuit 12 generates bit stuff and pointer justification outputs for use by an overhead gapfill circuit 19 and a pointer justification leaky accumulator circuit 20. Outputs of elastic store circuit 17, overhead gapfill circuit 19, and pointer justification leaky accumulator circuit 20 enter a mapping jitter elimination circuit 21 and pass through digital-to-analog converters 22, 24, and 26, respectively, and are combined at summing node 28. The combined output from summing node 28 enters a clock recovery phase lock loop circuit 29 and are filtered by a low pass filter 30 to drive a voltage controlled oscillator 32. Voltage controlled oscillator 32 generates an output clock signal to synchronously transmit a payload output 33 from elastic store circuit 17.

In operation, desynchronizer device 10 iterates on a specific number of bytes on synchronous channel 14 for a predetermined interval. The nominal frequency of the synchronous channel is 51.84 MHz. FIG. 2 is a diagram of how the embedded signal is mapped into a synchronous payload envelope of the synchronous channel as defined by the synchronous optical network (SONET) specification. The synchronous payload envelope includes 90 bytes; 3 bytes of transport overhead, 1 byte of path overhead, and 86 bytes of the mapped embedded signal. Nine synchronous payload envelopes make up a single frame on synchronous channel 14 of FIG. 1. The embedded signal is mapped with information bits, fixed stuff bits, stuff control bits, stuff opportunity bits, and overhead control bits.

Demapper circuit 12 processes information on synchronous channel 14 by extracting a synchronous payload envelope and then extracting the asynchronous data and clock rate of the embedded signal within the synchronous payload envelope. Demapper circuit 12 generates payload data 16 and payload clock 15 of the embedded signal for use by elastic store circuit 17 for storage of the asynchronous data. Demapper circuit 12 also provides bit stuff and pointer justification outputs which indicate whether or not timing adjustments have occurred during an iteration interval.

Elastic store circuit 17 is an up/down accumulator which accepts bit count increments from demapper circuit 12 and bit count decrements from voltage controlled oscillator 32. Elastic store circuit 17 maintains a running count of the difference between the number of received payload data bits and the number of transmitted payload data bits. The following discussion assumes that elastic store circuit 17 has a capacity of 512 bits, allowing a fluctuation of ± 256 bits.

Overhead gapfill circuit 19 calculates the effect of overhead gaps within the embedded signal. Overhead gaps necessary to map the asynchronous data to synchronous payload envelopes within synchronous channel 14 cause instantaneous variations in elastic fill value 18 of elastic store circuit 17 that do not reflect changes in the clock rate. Typically for the embedded signal, these overhead gaps occur at an 8 kilohertz rate and can be filtered out by low pass filter 30 of clock recovery phase lock loop circuit 29. However, adequate elimination of the effects of the overhead gaps requires a very low bandwidth phase lock loop on the order of 1 hertz. Wider bandwidth filters would be easier and more economical to implement than such a low bandwidth filter. Overhead gapfill circuit 19 allows for the implementation of wider bandwidth filters.

Overhead gapfill circuit 19 produces a gapfill value to effectively eliminate the overhead gaps from entry into low pass filter 30 and voltage controlled oscillator 32 of clock recovery phase lock loop circuit 29. Gapfill value 34 is combined with elastic fill value 18 of elastic store circuit 17 to eliminate the overhead gap contribution to elastic store circuit 17 before it can propagate through to low pass filter 30 and voltage controlled oscillator 32 of clock recovery phase lock loop circuit 29. Overhead gapfill circuit 19 calculates gapfill value 34 from the following equation:

$$gapfill_n = gapfill_{n-1} + (.9 \cdot NBPI) + BSD + [(207/29) \cdot PJ] - NBITS \quad (1)$$

where, $gapfill_{n-1}$ is the previous gapfill value, $(6.9 \cdot NBPI)$ is an expected number of data bits per synchronous channel byte $$\left( \text{information bits/bytes in synchronous payload envelopes} = \frac{5+200+208+208}{90} = 6.9 \right)$$

multiplied by number of synchronous channel bytes processed in each iteration,

BSD is the number of data bits occurring in the bit stuff position, $[(207/29) \cdot PJ)]$ is an expected number of data bits in an extra pointer justification byte $$\left( \text{information bits/bytes of embedded signal} = \frac{621}{87} = \frac{207}{29} \right)$$

multiplied by a pointer justification flag (+1 for added data byte, 0 for no adjustment, and −1 for stuff data byte), and NBITS is the number of embedded asynchronous data bits received in the elastic store circuit during the iteration interval.

Overhead gapfill circuit 19 receives the number of bytes processed, the number of bit stuffs occurring, and the pointer justification flag from demapper circuit 12. Overhead gapfill circuit 19 determines the effect of an overhead gap by determining the average number of data bits that should be received in the interval and subtracting the number actually received. The calculated value is added to the previous value to maintain an accumulated phase shift.

Timing adjustments due to bit stuffs and pointer justifications represent instantaneous phase shifts in the embedded signal data stream which also produces instantaneous changes to elastic fill value 18 of elastic store circuit 17. The effects of these instantaneous phase shifts can be sufficiently smoothed if a very low loop bandwidth, a small fraction of a hertz, is implemented in low pass filter 30 and voltage controlled oscillator 32 of clock recovery phase lock loop circuit 29. To avoid having a very low loop bandwidth and allowing for the use of a less stable voltage controlled oscillator, the timing adjustments can be digitally filtered. Pointer justification leaky accumulator circuit 20 accommodates this by accumulating recent pointer justification timing adjustments and subtracts them from elastic fill value 18 of elastic store circuit 17. In this manner, recent pointer justification timing adjustments are removed from the input to clock recovery phase lock loop circuit 29 of low pass filter 30 and voltage controlled oscillator 32.

An accumulated value 36 determined by pointer justification leaky accumulator circuit 20 is allowed to decay at a very slow rate, referred to as fractional bit leaking, to allow clock recovery phase lock loop circuit 29 to accommodate the phase adjustments on a gradual basis. The equation executed by pointer justification leaky accumulator circuit 20 once per iteration is:

$$PJA_n = PJA_{n-1} - [signof(PJA_{n-1}) \cdot (MIN + abs(PJA_{n-1})) = 19 \ (SCALE/1024)] - (7 \cdot PJ) \quad (2)$$

where, $PJA_{n-1}$ is the previous pointer justification accumulated value,

MIN is a programmable minimum leak rate (where 10 is a nominal value,

SCALE is a programmable factor (1, 2, 4, 8) that allows for accelerated leaking, and PJ is a pointer justification flag (+1 for added data byte, 0 for no adjustment, and −1 for stuff data byte.

The MIN value, scale factor, and 1024 divisor are designated for executing leak calculations at 1 millisecond intervals. A pointer justification timing adjustment opportunity, the time where PJ may have a non-zero value, occurs once every 500 microseconds. The accumulated PJA value is inverted by the term (7·PJ) to allow for positive summation in circuitry external to the digital logic, such as at summing node 28.

Digital-to-analog converter 22 converts elastic fill value 18 of elastic source circuit 17 to analog form by dividing the frequency of a most significant bit of an elastic store circuit 17 write address by 2 and exclusiveor'ing this result with a most significant bit of an elastic store circuit 17 read address divided by 2. For an elastic store circuit 17 having a store size of 512 bits, the most significant bits change state once every 11.44 microseconds (elastic store capacity of 512 bits/nominal center frequency of voltage controlled oscillator 32 of 44.736 MHz). More frequent measures of elastic fill value 18 of elastic store circuit 17 may be obtained by implementing an enhanced mode that uses less significant bits in the addresses. This enhanced mode inserts extra speed up or slow down transitions in elastic fill value 18 of elastic store circuit 17 in between changes of state of the most significant bits. Since the enhanced mode provides more gain for small phase offsets but less dynamic range, it may be desirable to disable the enhanced mode during phase lock loop initialization. FIG. 3 shows the timing diagram for the speed up and slow down transitions of the enhanced mode implementation that may be performed by digital-to-analog converter 22.

Digital-to-analog converter 24 generates a pulse width modulation output containing gapfill value 34 of overhead gapfill circuit 19. Gapfill value 34 is generated once every 3.086 seconds or every 20 synchronous channel bytes at digital-to-analog converter 24. Digital-to-analog converter 26 generates a pulse width modulation output containing accumulated value 36 from pointer justification leaky accumulator circuit 20. Accumulated value 36 is generated once every 1 millisecond at digital-to-analog converter 26.

FIG. 4 is a simplified diagram of low pass filter circuit 30. Low pass filter circuit 30 includes resistors R1, R3, and R4 tied to elastic fill value 18, accumulated value 36, and gapfill value 34, respectively, which are tied to summing node 28. A resistor R2, a capacitor C, and an operational amplifier 38 make up the low pass filter components of low pass filter 30. The three input resistors R1, R3, and R4 provide the summing function of summing node 28 as well as contributing to the definition of the loop bandwidth $\omega_n$. Clock recovery phase lock loop circuit 29 of low pass filter 30 and voltage controlled oscillator 32 is a conventional second order phase lock loop defined by a low pass filter transfer function:

$$F(s) = \frac{1 + sT_2}{sT_1} \quad (3)$$

and open loop transfer function:

$$G(s) = K_d F(s) K_0 \left( \frac{1}{s} \right) = \frac{2\zeta\omega_n s + \omega_n^2}{s^2} \quad (4)$$

and a closed loop transfer function:

$$H(s) = \frac{2\zeta\omega_n s + \omega_n^2}{s^2 + 2\zeta\omega_n s + \omega_n^2} \quad (5)$$

where, $T_1 = R1 \cdot C$ which equals a loop time constant in seconds, $T_2 = R2 \cdot C$ which equals a loop time constant in seconds, $K_d$ is the phase detector gain in volts per cycle, $R_1$ is resistance in ohms, $R_2$ is resistance in ohms, C is capacitance in farads, $K_0$ is the VCO gain factor in hertz per volt, $F_0$ is the VCO center frequency in hertz, KA is equal to $K_d \cdot K_0$ which is the loop gain in hertz per cycle, $\omega_n$ is equal to the square root of KA divided by $T_1$ which is the closed loop natural frequency in radians per second, is a constant, LDR is equal to $\omega_n T_2$ divided by 2 which is the loop damping ratio.

Resistor R3 is identical in value to resistor R1. The value of resistor R4 is determined such that equal input currents flow through each of resistors R1, R3, and R4. Gapfill value 34 is pulse width modulated with each new calculation of gapfill value 34 for combination to elastic fill value 18 of elastic store circuit 17 and accumulated value 36 of the timing adjustments. For an overhead gapfill circuit 19 having a 12 bit width (11 bits of magnitude and 1 bit of polarity), the seven most significant bits are used with the 51.84 MHz clock of the synchronous channel and the pulse width modulator is scaled to 128 counts out of 160 counts in an interval. Elastic fill value 18 of elastic store circuit 17 has a voltage range of 2.5 volts for a full scale value of 256 and 2.5/256 volts per bit. Gapfill value 34 has a voltage range of $(128/160) \cdot 2.5 = 2$ volts for a full scale value of 2048/29 and 29/1024 volts per bit. For equal input currents per bit into summing node 28 $(2.5/256)/R_1$ must equal $(29/1024)/R_4$. Hence $R_4 = (29/10) \cdot R_1$. Table I shows representative values of selected loop parameters.

TABLE I

| | |
|---|---|
| $R_1$ = 15K | C = 0.33 μR |
| $R_2$ = 499K | $K_d$ = 8.8 volts/UI |
| $R_3$ = 15K | $K_o$ = 955 Hz/v |
| $R_4$ = 43.2K | $\omega_n$ = 41.2 rps |
| | LDR = 3.39 |

Though specific values for certain parameters are shown, none of the parameter tolerances are critical except for the ratio R4/R1=2.9.

Desynchronizer device 10 produces output jitter from three different sources—mapping jitter due to overhead gaps, waiting time jitter produced by bit stuffing opportunities, and jitter produced by pointer justifications. Overhead gapfill circuit 19 determines gapfill value 34 to account for the effect of the overhead gaps and eliminate mapping jitter from the output of desynchronizer device 10. Similarly, pointer justification leaky accumulator circuit 20 determines accumulated value 36 and fractional bit leaking allows clock recovery phase lock loop circuit 29 to accommodate the phase adjustments on a gradual basis to reduce the effect of pointer justification jitter on the output of desynchronizer device 10. Pointer justification leaky accumulator circuit 20 may also account for the waiting time jitter by including bit stuff increments in equation 2. The new equation to account for bit stuff increments is:

$$PJA_n = PJA_{n-1} - [signof(PJA_{1-n}) \cdot (Min + abs(PJA_{n-1})) \cdot (SCALE/1024)] \\ -(7 \cdot PJ) - BSA \quad (6)$$

where

BSA is a bit stuff adjustment value indicating a variation from a nominal stuff ratio of 2/3 (BSA=+2/3 for data bit in stuffing opportunity, 0 for no stuffing opportunity, −1/3 for stuff bit in stuffing opportunity).

The fractional bit leaking of the accumulated value will also reduce the waiting time jitter due to bit stuffs through this enhanced addition to the equation for pointer justification leaky accumulator circuit 20.

In summary, a desynchronizer eliminates mapping jitter on its output by calculating the overhead gaps in an embedded signal mapped into a synchronous channel. These overhead gaps cause instantaneous variations in the elastic fill value of an elastic store circuit which propagate onto the payload output resulting in the mapping jitter. An overhead gapfill circuit uses bit stuff outputs, pointer justification outputs, and data outputs from a demapper circuit to calculate a gapfill value for the overhead gaps. The gapfill value is added to the elastic fill value of an elastic store circuit to eliminate the instantaneous variations due to overhead gaps from entering into a clock recovery phase lock loop of a low pass filter and a voltage controlled oscillator. Jitter from bit stuffing operations and pointer justifications are reduced by eliminating an accumulated value determined by a pointer justification leaky accumulator circuit from the elastic fill value of the elastic store circuit prior to implementation of the low pass filter and voltage controlled oscillator of the clock recovery phase lock loop.

Thus, it is apparent that there has been provided, in accordance with the present invention, an apparatus and method for eliminating mapping jitter that satisfy the advantages set forth above. Although the preferred embodiment has been described in detail, it should be understood that various changes, substitutions, and alterations can be made herein. For example, though specific values and timing intervals have been discussed, alternate values and timing intervals may be used with similar effectiveness. Furthermore, analog summation can be implemented digitally. Other changes may be made by one skilled in the art without departing from the spirit and scope of the invention as defined by the following claims.

What is claimed is:

1. A desynchronizer, comprising:
    a demapper circuit for reading asynchronous data received over a synchronous channel;
    an elastic store circuit for storing said asynchronous data from said demapper circuit;
    an overhead gapfill circuit for determining instantaneous variations in a fill level of said elastic store circuit in response to overhead gaps within said asynchronous data;
    a mapping jitter elimination circuit for eliminating said instantaneous variations in response to said fill level of said elastic store circuit;
    a clock recovery circuit for generating a clock signal in response to said elimination of said instantaneous variations, said clock signal operable to transmit said asynchronous data from said elastic store circuit.

2. A desynchronizer, comprising:
    a demapper circuit for reading asynchronous data received over a synchronous channel;
    an elastic store circuit for storing said asynchronous data from said demapper circuit;
    an overhead gapfill circuit for determining instantaneous variations in said elastic store circuit in response to overhead gaps within said asynchronous data;
    a mapping jitter elimination circuit for eliminating said instantaneous variations from said elastic store circuit;
    a clock recovery circuit for generating a clock signal in response to said elimination of said instantaneous variations, said clock signal operable to transmit said asynchronous data from said elastic store circuit, wherein said demapper circuit generates timing adjustment signals that indicate bit stuffs and pointer justifications made to said asynchronous data for transmission on said synchronous channel, said overhead gapfill circuit processing said timing adjustment signals in order to determine said instantaneous variations.

3. The desynchronizer of claim 1, wherein said clock recovery circuit includes a low pass filter and a voltage controlled oscillator.

4. The desynchronizer of claim 1, further comprising:
    a pointer justification leaky accumulator circuit for accumulating pointer justification timing adjustments, said mapping jitter elimination circuit gradually eliminating said pointer justification timing adjustments from said asynchronous data.

5. A desynchronizer, comprising:
    a demapper circuit for reading asynchronous data received over a synchronous channel;
    an elastic store circuit for storing said asynchronous data from said demapper circuit;
    an overhead gapfill circuit for determining instantaneous variations in said elastic store circuit in response to overhead gaps within said asynchronous data;
    a mapping jitter elimination circuit for eliminating said instantaneous variations from said elastic store circuit;
    a clock recovery circuit for generating a clock signal in response to said elimination of said instantaneous variations, said clock signal operable to transmit said asynchronous data from said elastic store circuit;
    a pointer justification leaky accumulator circuit for accumulating pointer justification timing adjustments, said mapping jitter elimination circuit gradually eliminating said pointer justification timing adjustments from said asynchronous data, wherein said pointer justification leaky accumulator circuit receives bit stuff timing adjustments from said demapper circuit, said mapping jitter elimination circuit gradually eliminating said bit stuff timing adjustments from said store circuit.

6. A desynchronizer, comprising:
    a demapper circuit for reading asynchronous data received over a synchronous channel, said demapper circuit generating bit stuff and pointer justification timing adjustment signals;
    an elastic store circuit for storing said asynchronous data from said demapper circuit, said elastic store circuit generating an elastic fill value that indicates a depth of said asynchronous data stored within said elastic store circuit;
    an overhead gapfill circuit for determining a gapfill value that indicates instantaneous variations in said elastic fill value of said elastic store circuit caused by overhead gaps within said asynchronous data in response to said bit stuff and pointer justification timing adjustment signals;
    a jitter elimination circuit for combining said gapfill value with said elastic fill value in order to eliminate mapping jitter causing instantaneous variations in said elastic fill value, said jitter elimination circuit generating a combined value of said gapfill value and said elastic fill value; and
    a clock recovery circuit for generating a clock signal in response to said combined value, said clock signal operable to transmit said asynchronous data from said elastic store circuit without infecting mapping jitter.

7. The desynchronizer of claim 6, further comprising:
    a pointer justification leaky accumulator for receiving said bit stuff and pointer justification timing adjustment signals to accumulate and leak bit stuff and pointer justification timing adjustments made to said asynchronous data during placement on said synchronous channel, said jitter elimination circuit reducing waiting time jitter and pointer induced jitter from said clock rate caused by said bit stuff and pointer justification timing adjustments respectively.

8. The desynchronizer of claim 7, wherein said pointer justification leaky accumulator circuit generates an accumulated value in response to said bit stuff and pointer justification timing adjustment signals, said jitter elimination circuit combining said accumulated value with said elastic fill value and said gapfill value to produce said combined value and reduce bit stuff and pointer justification timing adjustment effects from said elastic fill value.

9. The desynchronizer of claim 8, further comprising:
a digital to analog converter for converting said elastic fill value, said gapfill value, and said accumulated value into analog signals, said elastic fill value, said gapfill value, and said accumulated value having equivalent current strengths.

10. The desynchronizer of claim 9, wherein said digital-to-analog converter converts said elastic fill value to analog form by exclusive-or'ing a most significant bit of a write address of said elastic store circuit whose frequency is divided by two with a most significant bit of a read address of said elastic store circuit whose frequency is divided by two.

11. The desynchronizer of claim 10, wherein said digital-to-analog converter takes more frequent measures of said elastic fill value by inserting transitions in said elastic fill value in between changes of state of said most significant bits.

12. The desynchronizer of claim 6, wherein said overhead gapfill circuit determines said gapfill value from $$gapfill_n = gapfill_{n-1} + (.9 \cdot NBPI) + BSD + [(207/29) \cdot PJ] - NBITS \quad (7)$$

where,
$gapfill_{n-1}$ is the previous gapfill value, $6.9 \cdot NBPI$ is an expected number of data bits per synchronous channel byte $$\text{information bits/bytes in synchronous payload envelopes} = \left( \frac{5 + 200 + 208 + 208}{90} = 6.9 \right)$$

multiplied by number of synchronous channel bytes processed in each iteration,
BSD is the number of data bits occurring in the bit stuff position,
$[(207/29) \cdot PJ)]$ is an expected number of data bits in an extra pointer justification byte $$\left( \text{information bits/bytes of embedded signal} = \frac{621}{87} = \frac{207}{29} \right)$$

multiplied by a pointer justification flag (+1 for added data byte, 0 for no adjustment, and −1 for stuff data byte), and
NBITS is the number of embedded asynchronous data bits received in the elastic store circuit during the iteration interval.

13. The desynchronizer of claim 9 wherein said pointer justification leaky accumulator circuit determines said accumulated value from $$PJA_n = PJA_{n-1} - [signof(PJA_{n-1}) \cdot (Min + abs(PJA_{n-1})) \cdot (SCALE/1024)] - (7 \cdot PJ) - BSA \quad (8)$$

where
BSA is a bit stuff adjustment value indicating a variation from a nominal stuff ratio of 2/3 (BSA=+2/3 for data bit in stuffing opportunity, 0 for no stuffing opportunity, −1/3 for stuff bit in stuffing opportunity).

where,
$PJA_{n-1}$ is the previous pointer justification accumulated value,
MIN is a programmable minimum leak rate (where 10 is a nominal value,
SCALE is a programmable factor (1, 2, 4, 8) that allows for accelerated leaking, and
PJ is a pointer justification flag (+1 for added data byte, 0 for no adjustment, and −1 for stuff data byte.

14. A method for eliminating mapping jitter, comprising the steps of:
reading asynchronous data from a synchronous channel;
storing the asynchronous data;
generating a fill value indicating an amount of asynchronous data stored;
determining a number of bit stuff and pointer justification timing adjustments made to the asynchronous data during incorporation to the synchronous channel;
determining a number of overhead gaps in the asynchronous data in response to the bit stuff and pointer justification timing adjustments and the amount of asynchronous data stored;
creating an adjusted fill value by eliminating the number of overhead gaps from the fill value; and
recovering a clock rate in response to the adjusted fill value in order to transmit the stored asynchronous data.

15. The method of claim 14, further comprising the step of:
gradually eliminating the bit stuff and pointer justification timing adjustments from the fill value during creation of the adjusted fill value.

16. The method of claim 15, wherein said adjusted fill value creating step includes converting the number of overhead gaps, the number of bit stuff and pointer justification timing adjustments, and the fill value into analog signals having the same current strength.

17. The method of claim 16, wherein said adjusted fill value creating step includes combining the analog signals into the adjusted fill value prior to said clock rate recovery step.

18. The method of claim 16, wherein the fill value is converted to analog form by exclusive-or'ing a most significant bit of a write address whose frequency is divided by two with a most significant bit of a read address whose frequency is divided by two, the write address used in said asynchronous data storing step and the read address used in said clock rate recovering step.

19. The method of claim 18, wherein the fill value is measured more frequently by inserting transitions in the fill value in between changes of state of the most significant bits of the write and read addresses.

* * * * *